UNITED STATES PATENT OFFICE.

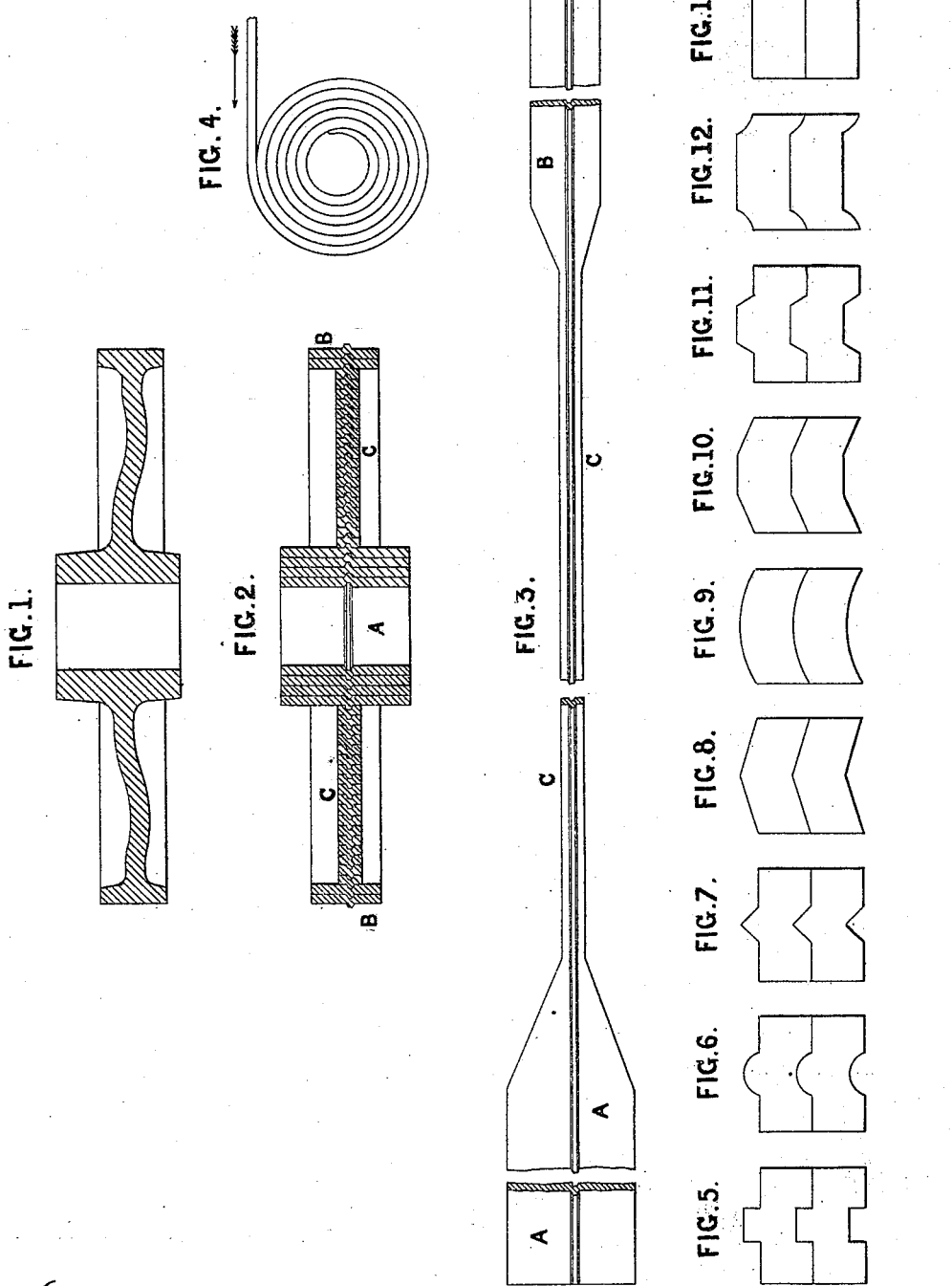

ALFRED KRUPP, OF ESSEN, PRUSSIA.

IMPROVEMENT IN THE MANUFACTURE OF RAILWAY-CAR WHEELS.

Specification forming part of Letters Patent No. 181,853, dated September 5, 1876; application filed June 23, 1876.

*To all whom it may concern:*

Be it known that I, ALFRED KRUPP, of Essen, Prussia, have invented certain Improvements in the Construction of Railway and other Wheels, of which the following is a specification:

The object of this invention is to construct wheels from bars of wrought-iron, and to form them into disks in such a manner that they shall have the greatest strength circumferentially combined with economy of material.

In order to carry this into effect, I forge or roll a long flat bar of iron, the length of which is about equal to form one wheel. The two ends are forged of greater widths than the body of the bar, the width at one end being about equal to the depth of the intended boss or nave, with allowance left for finishing. The width of the other end is equal to the width of the rim, and the width of the body of the bar is equal to the thickness of the body of the wheel.

In order to form the wheel, the bar is heated to a welding-heat in a properly-constructed furnace, and the end of the bar destined to form the nave is fixed onto a mandrel or round bar, and this mandrel is caused to rotate, and to wind the heated bar upon itself until the whole bar is wound up, when it will be found to have assumed the shape of a disk wheel, the two wider ends of the bar forming the boss and rim of the wheel, respectively. The partially-formed wheel is then placed in a welding-furnace and heated to the proper degree, and then welded together in a frame under the hammer, or in a powerful hydraulic press, until the wheel is formed into the proper shape, when it can be finished in a lathe in the usual way.

In order to insure a better weld, and to prevent the possibility of any portion of the spiral slipping laterally, the bar is rolled with a feather or tongue and groove, so that, as the bar is wound round on the mandrel, the feather on one side takes into the groove on the other, and the whole is rendered perfectly compact.

And in order that the invention may be more clearly understood, reference is given to the accompanying drawings.

Figure 1 is a section of a wheel in the completed state; Fig. 2, a section showing its structural formation and before the coil has been welded and pressed or hammered into shape. Fig. 3 is a plan of the bar in the flat state; and Fig. 4 is a view of the bar as it appears when being wound upon itself into the form of a wheel.

The bar is rolled, hammered, or shaped into the form represented in Fig. 3, having the ends A and B formed wider than the body C. The end A is somewhat wider than B, and is destined, when wound up, to form the nave of the wheel, the narrow part C the body, and the end B the rim.

To form the wheel, the bar is heated in a suitable furnace to a welding-heat, or nearly so, and the end A is then attached to a mandrel or shaft, which is caused to revolve, and thus to wind the bar upon itself, as shown in Fig. 4. It will then be found that the coil will resemble somewhat the appearance shown in Fig. 2, where A represents the nave, B the rim, and C the body of the wheel.

To prevent the scale that forms upon iron bars when heated from being wound up in the coil, the bar, as it comes from the furnace, may be made to pass through between wire brushes.

When the bar is coiled up into the form of a wheel, it is then heated to a welding-heat, and either welded by blows from a hammer or by means of pressure, the wheel being fitted into a frame, and the form shown in Fig. 1, or any other suitable shape, may also be given to it at the same time.

When cold, the wheel may be turned, bored, and finished in the usual way.

To prevent any lateral slip of the coil, and to form also a better weld, the bar has a tongue and groove, or of shapes shown in Figs. 3, 5, 6, 7, 8, 9, 10, 11, 12, or any other analogous shape, the effect being that, in rolling the bar round the mandrel, the tongue on one side will take into the groove on the other side of the bar, and thus the whole will be formed into one compact mass.

Fig. 13 shows the bar formed of the ordinary flat section.

I claim—

The method herein specified of making wheels by forging or rolling a bar with the end portions wide and the middle portions narrow, with a rib or projection on one side, and a corresponding groove on the other extending the entire length, and then rolling said bar upon itself to form a disk, and forging and welding the same, substantially as set forth.

ALFRED KRUPP.

Witnesses:
    DOCTOR CLEMENS FARBORN,
    ERNST HELFER.